Dec. 21, 1954          C. C. HUTCHINS ET AL          2,697,809
                     SINGLE PHASE INDUCTION MOTOR
                          Filed Aug. 4, 1950
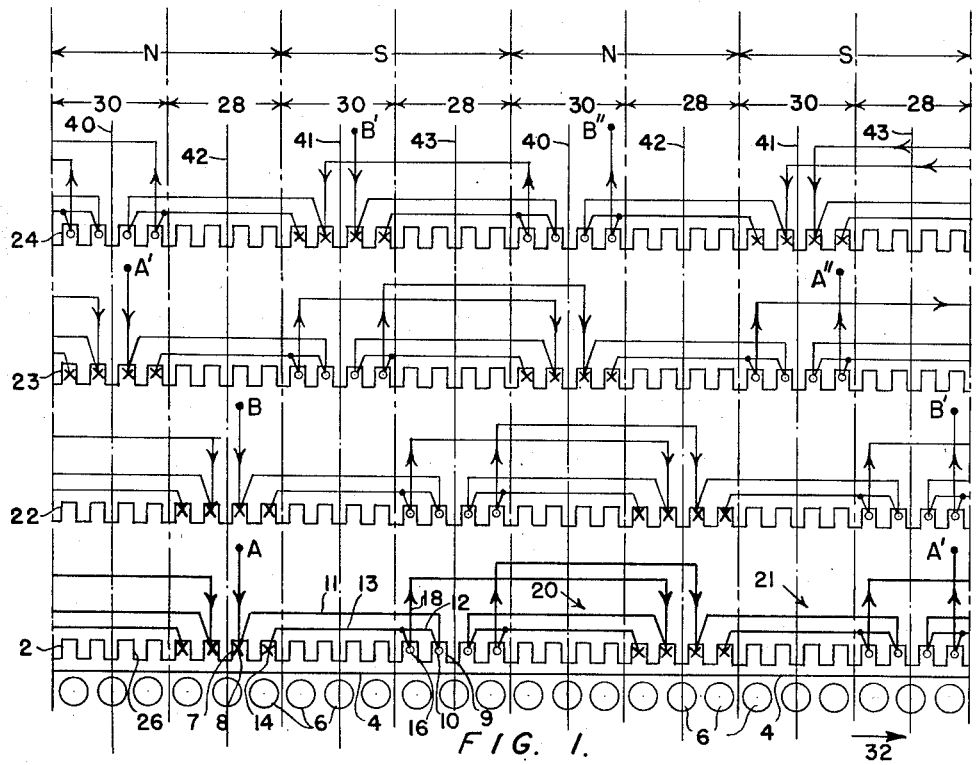
FIG. 1.
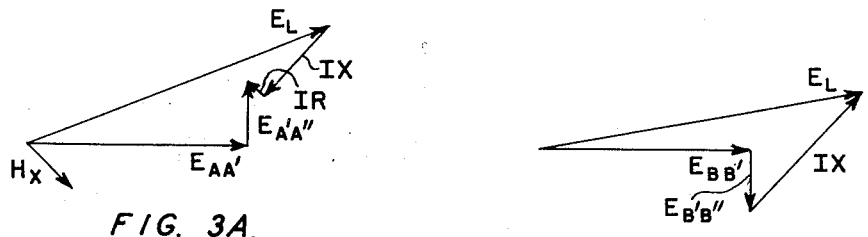
FIG. 3A.
FIG. 3B.
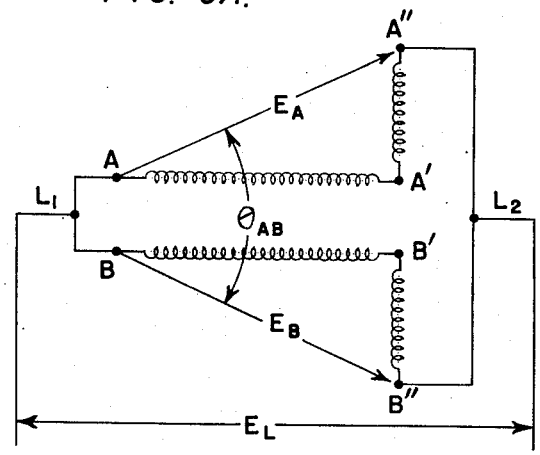
FIG. 2.
INVENTORS.
CHARLES C. HUTCHINS
& BLAIR C. SEAMAN
BY
*Busser and Harding*
ATTORNEYS.

United States Patent Office 2,697,809
Patented Dec. 21, 1954

2,697,809

SINGLE PHASE INDUCTION MOTOR

Charles C. Hutchins and Blair C. Seaman, Ridgway, Pa., assignors to Hutchins Electric Company, Inc., Ridgway, Pa., a corporation of Pennsylvania Application August 4, 1950, Serial No. 177,634

5 Claims. (Cl. 318—220)

This invention relates to electric motors and more specifically to alternating current motors of the single phase variety.

We have discovered that an effect recognized as occurring partially in multiple winding transformers may be utilized in single phase motor starting in a manner to partially imitate the action of a condenser or capacitor and then can be caused to cease to so function thereby improving the motor starting system.

By arranging a section of winding to establish and govern the mutual flux of the machine during the starting cycle, any other less powerful section wound adjacent to that section and in reverse with respect to that section exhibits an induced current due to inductive effects between the windings. These inductive effects appear in a negative sense to that of the governing winding, hence, with respect to the motor rotor circuits the influence may be governed by design ratio to give somewhat the same effect as if the circuit actually included a capacitor, the motor thus may be adjusted to start readily and with a powerful torque.

The windings may be so proportioned as to turn ratio and placement or spacing of the coils to eliminate the necessity for the use of the switching operation when the motor comes up to speed by making the counter electromotive force of the reversely wound or differential section equal and opposite to the line voltage or, alternatively, approximately so when the motor is running at normal operating speed.

It is an object of this invention to provide an improved form of motor winding wherein certain of the winding sections are connected in differential or reverse sense to master or governing sections and wherein all winding sections may be continuously energized at all times during operation of the motor, the differential sections being so proportioned as to cause the counter electromotive force in the differential sections to match the applied voltage so that during running operation no undesirable circulating current flows between the sections.

It is another object of this invention to provide a motor winding in which, during the starting cycle, the time angle between the currents in the winding sections is greatly increased over that obtained by the conventional starting windings thus greatly increasing the starting torque over that obtained by conventional windings.

This circuit arrangement is basically new as heretofore, except for the disclosure made by Charles C. Hutchins in the patent application Serial No. 63,116, dated December 2, 1948, those skilled in the art have deemed it impossible to cause a divided motor circuit to attain suitable starting characteristics and also running balance and to eliminate circulating currents with all parallel portions of the circuit remaining continuously energized during motor operation.

The discovery of the possibility and the invention of means whereby without using accessories the time angle between the winding sections can be increased to values up to 70 electrical degrees at the instant of starting, thereby improving the motor starting characteristics beyond those which have heretofore been considered feasible, represents an advance of great economic importance in the art of single phase motor design. These and other objects of the invention will become apparent from the following description read in conjunction with the accompanying drawing, in which:

Figure 1 is a diagrammatic representation of the windings of a four pole motor showing winding sections developed in accordance with the present invention and disposed in winding slots;

Figure 2 is a diagrammatic representation of the electrical connections of the winding sections shown in Figure 1; and Figures 3A and 3B are vector diagrams showing the voltages existing in the winding sections.

Referring to Figure 1 there is shown diagrammatically in developed form the stator winding slots 2, the rotor 4 and rotor conductor bars 6. Disposed within the winding slots 2 is the winding A—A'. The winding is represented as having the current entering at the connection marked A and passing through a conductor lying in a winding slot 7 in a direction away from the viewer as indicated by the x-mark 8, representative of the tail end of an arrow. The current flowing through this conductor lying in the slot 7 passes through a conductor, not shown, extending from the far end of the slot 7 to the far end of the slot 9 and returns in a conductor lying in the slot 9 toward the viewer as indicated by the small circle 10 representative of a point of an arrow. The current is then carried by the conductor 11 back to the winding slot 7. After the current has passed through a plurality of winding turns, as indicated by the lines 8, 10 and 11, it is carried through jumper 12 to the coil indicated by the lines 13, 14 and 16. After passing through a plurality of turns of this coil the current passes out of the coil through the connection 18 whereby it is admitted to the next successive coil indicated generally at 20, and from the coil 20 current passes to the coil 21 and thus successively through coils distributed in winding slots until the current emerges at the connection marked A'. This showing of the motor windings will be recognized by one skilled in the art as being a conventional showing of motor windings.

There is also shown in Figure 1 winding slots 22, 23 and 24 containing respectively the windings B—B', A'—A" and B'—B". It will be appreciated that the winding slots 22, 23 and 24 represent merely repeated showings of the winding slots 2 and are provided in order that the windings B—B', A'—A" and B'—B" may be clearly shown as individual windings. In an actual motor construction the winding B—B' is disposed adjacent to and in the same winding slots with the winding A—A', and the winding B'—B" is disposed adjacent to and in the same winding slots with the winding A'—A". Thus, the winding slot 7 will contain coils of the winding A—A' and also will contain coils of the winding B—B'.

It should be noted that these coils as indicated in Figure 2 are connected in parallel arrangement with respect to each other and each carries current flowing in the same direction. The coils of windings A—A' and B—B' are magnetically additive in their effect in that the fields existing about each of the windings extend in the same direction. These windings are hereinafter referred to as being cumulative windings and magnetically additive in their effect.

The coils of windings A'—A" and B'—B" are also disposed adjacently in winding slots. Thus, for example, the winding slot marked 26 would contain coils of both of these windings. It should be noted that the currents passing through these coils are passing in opposing directions. Thus the fields existing about the windings extend in opposite directions and the coils will be magnetically subtractive in their effect. These coils are referred to as differential windings and are shown in Figure 2 as being displaced 180 electrical degrees with respect to each other.

Areas of the motor stator are indicated by the letters N and S, the conventional polar notations and each area is divided into two parts as indicated at 28 and 30. In the areas 28 where the windings are in magnetically cumulative relation there is greater inductance than in the areas 30 where the windings are in magnetically subtractive relation. This arises because there are more flux linkages in the area where the action is cumulative. Thus there is a time differential between the two areas and the starting action of the motor is across the pole faces from the magnetically subtractive areas 30 to the magnetically additive areas 28. This, of course, assumes that the resistance values of the windings are not too dissimilar. With rotation of the rotor as indicated by the arrow 32, the area 28 represents the later rotor traversed part of the area and in this area the magnetic action of the cumulative windings A—A' and B—B' is additive in effect as has been previously described. The area 30 represents the trailing or later rotor traversed part of the area and in this section the magnetic action of the differential circuits A'—A'' and B'—B'' are magnetically subtractive in effect. The winding A—A' and the winding A'—A'' are disposed in slots 90 electrical degrees apart and they are thus shown in Figure 2. The polar axes of the A—A' and B—B' windings are shown at 40 and 41, and the polar axes of the A'—A'' and B'—B'' windings are shown at 42 and 43.

It should be noted that in some instances it may be convenient or desirable to distribute the differential windings over only some of the poles or on alternate poles. This will be recognized by those skilled in the art as an obvious variation of the system disclosed herein. It will be equally obvious that a motor of any desired number of pairs of poles may be constructed to employ this system and further that, as is well known, the primary or secondary motor windings may be located on either the rotor or the stator without deviating from the invention as disclosed herein.

The partial parallel circuits of the winding indicated as A—A' and B—B' are disposed adjacently in the winding slots so that mutual flux linkages occur between them. These linkages are partly in common with the rotor circuits and partly in common with each other. Those linkages common to each other but not with the rotor circuits are classified normally as leakage flux as they do not assist in the transfer of power from the stator to the rotor but do operate to govern the transfer.

When a motor is in operation there is a counter electromotive force generated in each of these windings due to the equivalent relative motion of internal or rotor flux with respect to the stationary winding elements. The two windings are in the same identical positions and therefore the voltages generated in the windings each have the same identical time relationships, that is, the voltages are in-phase (as is usual the word phase means position). This is indicated in Figure 2 where the voltages generated in the sections A—A' and B—B' are in time phase because of their identical space phase.

Sections A'—A'' and B'—B'' are indicated as producing counter voltages of respectively different phase and are further indicated as being opposite in relationship. Saying this another way, the winding A'—A'' is 180 electrical degrees out of phase with the winding B'—B'' so far as internal voltage generation due to equivalent rotation of the rotor flux is concerned.

The magnitudes of the voltages generated in windings A—A', A'—A'', B—B' and B'—B'' are proportional to the number of conductors located respectively in each winding. Figure 2 has been drawn to diagram and indicates all of the preceding effects in the common and customary fashion. Accordingly, the windings A—A'—A'' and B—B'—B'' develop counter voltages not in-phase and of magnitudes proportional to the number of conductors or coil turns lying in the various portions of the windings. This is, of course, the behavior that would be exhibited by internal generating action. This is indicated, in Figure 2, by the two vectors $E_a$ and $E_b$ and, without considering the mutual reactance occasioned by the fact that all parts of the circuits A and B are continuously side-by-side in all used slots, the angle $\theta_{AB}$ would exist between these counter voltages as indicated.

Taking into account the mutual inductive effect between circuits A and B the result is much different. For purposes of explanation, consider circuit A to be the one selected as the main operating or governing circuit when the motor has been started and is operating at normal running speed. With the turns of winding B properly adjusted the current in circuit B can be made to vanish at this speed, that is, the counter voltage $E_B$ can be made to become equal and opposite to the line voltage $E_L$, whereas the counter voltage of circuit $E_A$ of circuit A remains somewhat less than the line voltage $E_L$ and at an angle to it allowing the normal flow of motor operating current. Under these conditions of no current in circuit B it follows that circuit B exhibits neither resistance nor reactance drops. Winding A, on the other hand, has both these normal effects present. The mutual effect of the leakage reactance drop in winding A upon winding B further assists in the proper adjustment of the counter voltage effect of winding B.

Current flowing in circuit A will establish a leakage flux that does not link with the motor rotor conductor bars. Most of this flux, however, due to the continuous side-by-side disposal of the windings in common slots, will link with the winding of circuit B. If no current flows through circuit B under these conditions a similar action on the part of the windings of circuit B does not occur. As the winding element A—A'—A'' is thus linked with the winding element B—B'—B'' through the linkage of mutual leakage flux, a transformer action or magnetic coupling occurs and as in any transformer the voltage induced in the winding B—B'—B'' by the action of the current flowing in winding A—A'—A'' is opposite in phase and, of course, proportional in magnitude to the relative number of conductors involved in the transfer.

This is illustrated in the vector diagrams of Figures 3A and 3B which are similar to the diagram of Figure 2 but have the mutual leakage action added. The vector diagram of Figure 3A shows the situation in circuit A where $E_L$ is the line voltage applied. $E_{AA'}$ is the voltage generated by the main motor flux action on the winding section A—A' and $E_{A'A''}$ is the voltage generated by the main motor flux action on the winding section A'—A''. For simplicity, the resistance and reactance drops in both sections A—A' and A'—A'' are lumped together and shown as IR and IX. It should be noted that IR and IX represent drops in voltage from the line value.

The vector diagram of Figure 3B represents the conditions in circuit B. The generated voltages $E_{BB'}$ and $E_{B'B''}$ are indicated in their proper space relationships as before, but here the IX value is being transferred from circuit A to circuit B and is in the opposite direction from its direction in circuit A, and thus represents a boost in counter voltage rather than a drop in voltage as in circuit A. The vector value of this transferred voltage is controlled by the turn ratio of the winding and is adjusted by proper selection of the turn ratio so that the vector sum of the voltages $E_{BB'}$, $E_{B'B''}$ and IX are substantially equal to $E_L$.

The diagrams of Figure 3 indicate in simplified form a qualitative explanation of the process of balancing the internal motor circuits so that while originally installed in cumulative and differential relationships and, in consequence, not in balanced positions they nevertheless may be adjusted by proper selection of turn ratio to bring the differential circuit B to a value of counter electromotive force equal and opposite to the line voltage, thus allowing no current to flow when the motor is running at normal operating speed.

At the instant of starting the effect of the winding arrangement is to provide without external accessories a split-phase starting action with a time angle of much greater magnitude than has been heretofore achieved. At stand-still the machine is best considered as a stationary transformer with a short-circuited secondary. As such, the distribution of the primary winding and the relative location of its elements are all important in determining whether or not starting torque appears. As has been previously stated, by arranging a section of the winding to establish and govern the mutual flux of the machine during the starting cycle another less powerful section wound in reverse and inductively compelled thereto exhibits an induced current due to the inductive effects. These inductive effects appear in the reverse section in a negative sense to that of the governing winding. Hence, with respect to the motor rotor circuits, the influence may be governed by winding turn ratio to give the same effect as if the circuit actually included a capacitor. The motor thus may be adjusted to start readily with a powerful torque.

While the pre-calculation of the motor becomes somewhat more involved than that necessary for the more customary arrangements it is not essential to be able to perform such calculations to utilize this invention as the motor may be constructed by anyone moderately skilled by a process of trial and adjustment. (Those highly skilled in the art will prefer to pre-calculate as usual.)

For purposes of explanation of such use of this invention any existing motor having normal and sufficient slot space and reasonable core proportions may be rewound for the system described by setting the in-phase wound part of the windings of the cumulative sections to include 75 to 85 per cent. of the total winding length. Then the differentially wound sections will constitute the remainder. A rough trial for original adjustment may be made using approximately 15 per cent. excess conductors in the B winding as compared to the A winding. Then, after test, the turn ratio is easily adjusted by partial rewinding in corrected proportion to make the current in winding B vanish at speeds above 85 to 90 per cent. of normal.

It is to be understood, however, that the present invention includes the utilization of the described differential effect for starting in motors in those cases where it may be used in conjunction with a switch as, for example, the use of a manual or automatic switch to remove the differential circuit at the end of the starting cycle and thus obtain the advantages of elimination of capacitors, etc., while at the same time exaggerating said negative inductive effect to the limit for the purpose of forcing the available starting effect to the limit. This method has economic advantages in certain applications and is to be considered as a definite part and teaching of this invention.

What is claimed is:

1. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and said first sections being in mutually inductive and substantially cumulative relation and said second sections being in mutually inductive and substantially differential relation to produce a substantial phase displacement between the winding currents for motor starting.

2. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and said first sections being in mutually inductive and substantially cumulative relation and said second sections being in mutually inductive and substantially differential relation, the mutually inductive sections of the windings providing a countervoltage in one of said windings to produce a substantial phase displacement between the winding currents for motor starting and to produce in combination with the normally existing motor countervoltage induced therein a reducing phase displacement between the winding currents as the motor speed approaches normal running speed.

3. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and said first sections being in mutually inductive and substantially cumulative relation and said second sections being in mutually inductive and substantially differential relation, the mutually inductive sections of the windings providing a countervoltage in one of said windings to produce a substantial phase displacement between the winding currents for motor starting and to produce in combination with the normally existing motor countervoltage induced therein a substantially in-phase condition between the winding currents when the motor is operating at normal running speed.

4. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and said first sections being in mutually inductive and substantially cumulative relation and said second sections being in mutually inductive and substantially differential relation, the cumulative sections of each of said windings each having a greater number of turns than each of the differential sections of said windings to produce a substantial phase displacement between the winding currents for motor starting.

5. A single phase alternating current motor comprising a first winding and a second winding connected in parallel and adapted to be connected across an alternating current source, each of said windings being divided into sections, a first section of said first winding and a first section of said second winding having coils positioned so that the polar axes of said first sections substantially coincide, a second section of said first winding and a second section of said second winding having coils positioned so that the polar axes of said second sections substantially coincide, the axes of said first sections being physically displaced from the axes of said second sections, and substantially all of the turns of said first sections being in mutually inductive and substantially cumulative relation and substantially all of the turns of said second sections being in mutually inductive and substantially differential relation, the mutually inductive sections of the windings providing a countervoltage in one of said windings to produce a substantial phase displacement between the winding currents for motor starting and to produce in combination with the normally existing motor countervoltage induced therein a reducing phase displacement between the winding currents as the motor speed approaches normal running speed.

References Cited in the file of this patent

UNITED STATES PATENTS

| Number | Name | Date |
|---|---|---|
| Re. 11,783 | Duncan | Nov. 7, 1899 |
| 416,195 | Tesla | Dec. 3, 1889 |
| 750,940 | Brown | Feb. 2, 1904 |
| 1,859,368 | Kennedy | May 25, 1932 |